(12) United States Patent
Fujisawa

(10) Patent No.: US 6,317,055 B1
(45) Date of Patent: Nov. 13, 2001

(54) MONITOR INFORMATION TRANSMITTING/RECEIVING APPARATUS IN SUBMARINE CABLE SYSTEM

(75) Inventor: Takanori Fujisawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/191,937

(22) Filed: Nov. 13, 1998

(30) Foreign Application Priority Data

Nov. 17, 1997 (JP) ................................................. 9-332379

(51) Int. Cl.$^7$ ................................................. H04B 13/02
(52) U.S. Cl. ........................... 340/850; 340/852; 359/141
(58) Field of Search .................................. 340/850, 852; 359/141, 174, 176, 177, 110

(56) References Cited

U.S. PATENT DOCUMENTS 5,383,046 * 1/1995 Tomofuji et al. ..................... 359/176
5,657,154 * 8/1997 Yoneyama ............................ 359/176

FOREIGN PATENT DOCUMENTS 4-122127   4/1992 (JP).

* cited by examiner

Primary Examiner—Timothy Edward
(74) Attorney, Agent, or Firm—Ostrolenk, Faber, Gerb & Soffen, LLP

(57) ABSTRACT

A monitor information transmitting/receiving apparatus transmits/receives monitor information data about each cable landing station in a submarine cable system in which a plurality of cable landing stations are arranged in the form of a ring. The apparatus includes a monitor information setting section and a selection section. The monitor information setting section generates monitor information to be sent by setting monitor information about a self-station in monitor information including monitor information data about each station which is received through each of routes in two directions, and containing data for specifying set times in the monitor information. The selection section selects data, of the monitor information data about the respective stations which are received through the respective routes in the two direction, which corresponds to new set time as latest monitor information data.

15 Claims, 7 Drawing Sheets

FIG.5

| STX |
|---|
| ORDINAL NUMBER FOR STATION A:01 |
| MONITOR INFORMATION DATA ABOUT STATION A |
| ORDINAL NUMBER FOR STATION B:08 |
| MONITOR INFORMATION DATA ABOUT STATION B |
| ORDINAL NUMBER FOR STATION C:07 |
| MONITOR INFORMATION DATA ABOUT STATION C |
| ORDINAL NUMBER FOR STATION D:06 |
| MONITOR INFORMATION DATA ABOUT STATION D |
| ORDINAL NUMBER FOR STATION E:05 |
| MONITOR INFORMATION DATA ABOUT STATION E |
| ORDINAL NUMBER FOR STATION F:04 |
| MONITOR INFORMATION DATA ABOUT STATION F |
| ORDINAL NUMBER FOR STATION G:03 |
| MONITOR INFORMATION DATA ABOUT STATION G |
| ORDINAL NUMBER FOR STATION H:02 |
| MONITOR INFORMATION DATA ABOUT STATION H |
| ETX |

FIG.6

| STX |
|---|
| ORDINAL NUMBER FOR STATION A:07 |
| MONITOR INFORMATION DATA ABOUT STATION A |
| ORDINAL NUMBER FOR STATION B:08 |
| MONITOR INFORMATION DATA ABOUT STATION B |
| ORDINAL NUMBER FOR STATION C:01 |
| MONITOR INFORMATION DATA ABOUT STATION C |
| ORDINAL NUMBER FOR STATION D:02 |
| MONITOR INFORMATION DATA ABOUT STATION D |
| ORDINAL NUMBER FOR STATION E:03 |
| MONITOR INFORMATION DATA ABOUT STATION E |
| ORDINAL NUMBER FOR STATION F:04 |
| MONITOR INFORMATION DATA ABOUT STATION F |
| ORDINAL NUMBER FOR STATION G:05 |
| MONITOR INFORMATION DATA ABOUT STATION G |
| ORDINAL NUMBER FOR STATION H:06 |
| MONITOR INFORMATION DATA ABOUT STATION H |
| ETX |

FIG.7

| STX |
|---|
| ORDINAL NUMBER FOR STATION A:07 |
| MONITOR INFORMATION DATA ABOUT STATION A |
| ORDINAL NUMBER FOR STATION B:08 |
| MONITOR INFORMATION DATA ABOUT STATION B |
| ORDINAL NUMBER FOR STATION C:07 |
| MONITOR INFORMATION DATA ABOUT STATION C |
| ORDINAL NUMBER FOR STATION D:06 |
| MONITOR INFORMATION DATA ABOUT STATION D |
| ORDINAL NUMBER FOR STATION E:05 |
| MONITOR INFORMATION DATA ABOUT STATION E |
| ORDINAL NUMBER FOR STATION F:04 |
| MONITOR INFORMATION DATA ABOUT STATION F |
| ORDINAL NUMBER FOR STATION G:05 |
| MONITOR INFORMATION DATA ABOUT STATION G |
| ORDINAL NUMBER FOR STATION H:06 |
| MONITOR INFORMATION DATA ABOUT STATION H |
| ETX |

MONITOR INFORMATION TRANSMITTING/RECEIVING APPARATUS IN SUBMARINE CABLE SYSTEM

BACKGROUND OF THE INVENTION

1. Field of the Invention

The present invention relates to a monitor information transmitting/receiving apparatus in each cable landing station in a submarine cable system in which a plurality of cable landing stations are arranged in the form of a ring and, more particularly, to a transmitting/receiving apparatus for transmitting/receiving monitor information about the self-station and a remote station in a submarine cable system.

2. Description of the Prior Art

As the demand for international lines grows, the line quality of the internal lines is considered more important. When a line fault occurs, a terminal apparatus in the cable landing station accommodating the corresponding line transmits many warnings to remote stations. In order to maintain high internal communication quality, each station in the system must monitor the states of each line and station in the system by obtaining monitor information about remote stations. In the submarine cable system, communication is often performed between two or three cable landing stations. In this system, it is relatively easy for a given cable landing station to obtain monitor information such as fault information about remote stations.

In some submarine cable system, a plurality of cable landing stations are arranged in the form of a ring. In such system, when a given station is to obtain monitor information about each station, the given station must also obtain monitor information from stations to which the given station is not directly line-connected. In a communication system constituted by terrestrial stations, a LAN for transmission/reception of monitor information can be easily installed in addition to lines for communication. In a submarine cable system, however, it is difficult to perform such operation, and hence monitor information must be transmitted/received by using the lines of the submarine cables for communication.

As described above, in a submarine cable system in which a plurality of cable landing stations are arranged in the form of a ring, each station must obtain monitor information about remote stations by using limited lines. In addition, as described above, to maintain high internal communication quality, each station in the system must accurately obtain monitor information about remote stations.

For example, a scheme of transmitting/receiving monitor information between two cable landing stations in a submarine cable system is disclosed in Japanese Unexamined Patent Publication No. 4-122127.

SUMMARY OF THE INVENTION

The present invention has been made in consideration of the above situation, and has as its object to provide a monitor information transmitting/receiving apparatus in a submarine cable system in which a plurality of cable landing stations are arranged in the form of a ring, which allows the respective stations to transmit/receive monitor information with high reliability by using the lines of submarine cables.

In order to achieve the above object, according to the main aspect of the present invention, there is provided a monitor information transmitting/receiving apparatus for transmitting/receiving monitor information data about each cable landing station in a submarine cable system in which a plurality of cable landing stations are arranged in the form of a ring, comprising monitor information setting means for generating monitor information to be sent by setting monitor information about a self-station monitor information including monitor information data about each station which is received through each of routes in two directions, and containing data for specifying set times in the monitor information, and selection means for selecting data, of the monitor information data about the respective stations which are received through the respective routes in the two direction, which corresponds to new set time as latest monitor information data.

The monitor information setting means may include superimposition means for storing received monitor information, rewriting only the monitor information data about the self-station, of the stored information, and sending the monitor information.

The monitor information setting means may use a number whose numerical value increases with time as data for specifying settime.

The selection means may select data, of the monitor information data about the respective stations which are received through the respective routes in the two directions, which corresponds a larger number.

The transmitting/receiving apparatus may further comprise signal processing means for setting monitor information in an overhead signal.

As is obvious from the above aspects, since the monitor information transmitting/receiving apparatus in the submarine cable system includes the monitor information setting means for setting monitor information about the self-station in monitor information including monitor information data about each station which is received through each of routes in two directions, and containing data for specifying set times in the monitor information, and the selection means for selecting data, of the monitor information data about the respective stations which are received through the respective routes in the two direction, which corresponds to new set time as latest monitor information data. With this arrangement, the reliability of monitor information received by each station can be improved owing to the redundancy of monitor information transfer, and each station can quickly obtain information about the remaining stations.

If the monitor information setting means is designed to store received monitor information and send monitor information upon rewriting only the monitor information data about the self-station of the stored information, the arrangement for transmitting monitor information can be simplified.

If the monitor information setting means is designed to use a number whose numerical value increases with time as data for specifying set time, processing for data for specifying the set time can be simplified.

If the selection means is designed to select monitor information data, of the monitor information data about the respective stations which are received through the respective routes in the two direction, which corresponds to a larger number, latest data can be easily selected.

If the transmitting/receiving apparatus further includes a signal processing means for setting an overhead signal in monitor information, a system for transferring monitor information by using the lines of submarine cables can be easily constructed.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIG. 5 is a view for explaining an example of monitor information received through an inner route;

FIG. 6 is a view for explaining an example of monitor information arrived through an outer route; and FIG. 7 is a view for explaining an example of monitor information supplied to a monitor.

DETAILED DESCRIPTION OF THE PREFERRED EMBODIMENT

The preferred embodiment of the present invention will be described in detail below with reference to the accompanying drawings.

Figure 1:
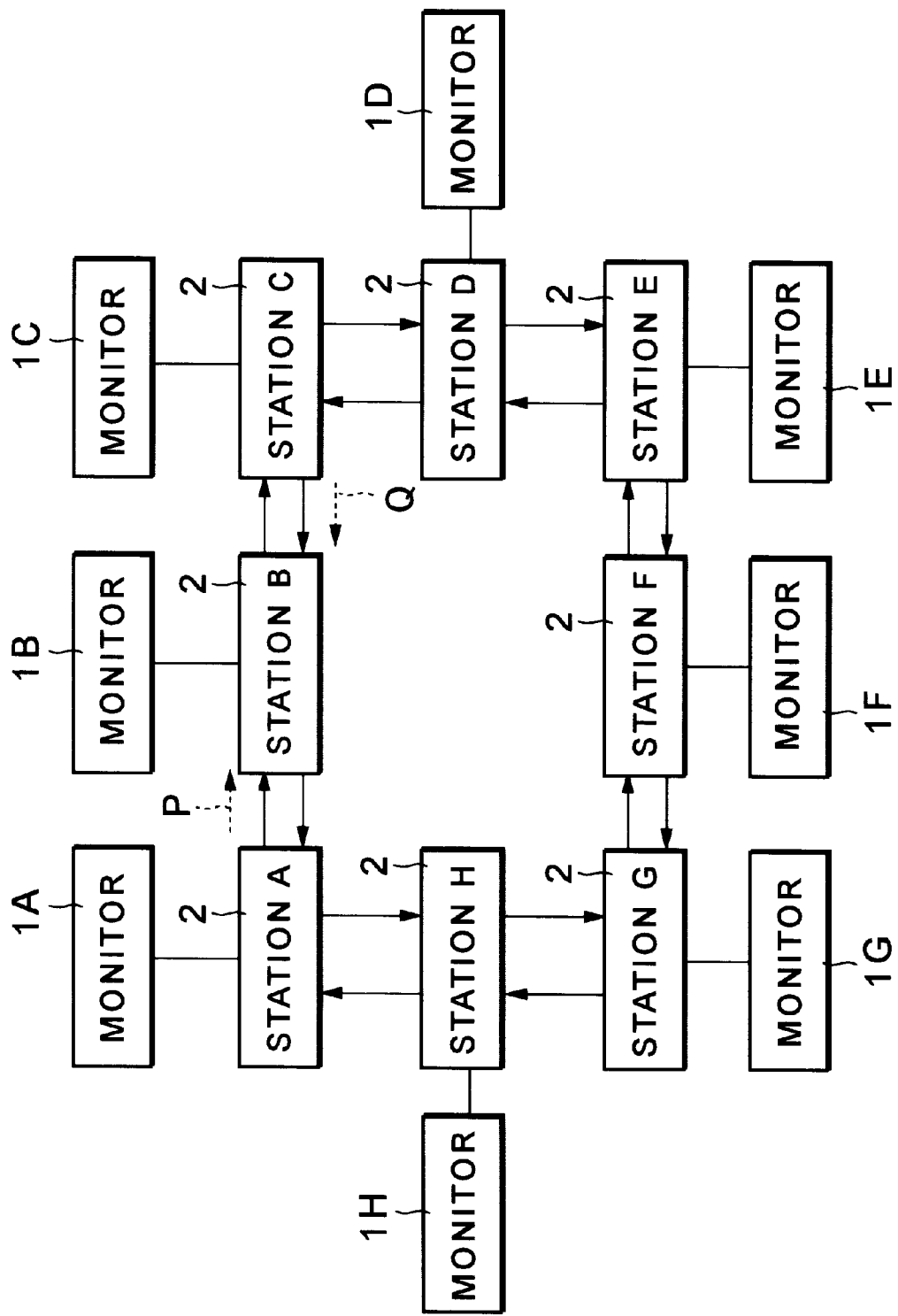
FIG. 1 is a block diagram showing an example of the arrangement of a submarine cable system in which a plurality of cable landing stations are arranged in the form of a ring.

FIG. 1 shows an example of the arrangement of a submarine cable system in which a plurality of cable landing stations 2 are arranged in the form of a ring. In this case, a total of eight cable landing stations are present, and a pair of submarine optical cables are installed between each pair of adjacent stations. In addition, monitors 1A to 1H are provided for the respective cable landing stations 2 (the stations A to H) Referring to FIG. 1, reference symbol P denotes an outer route; and Q, an inner route.

Figure 2:
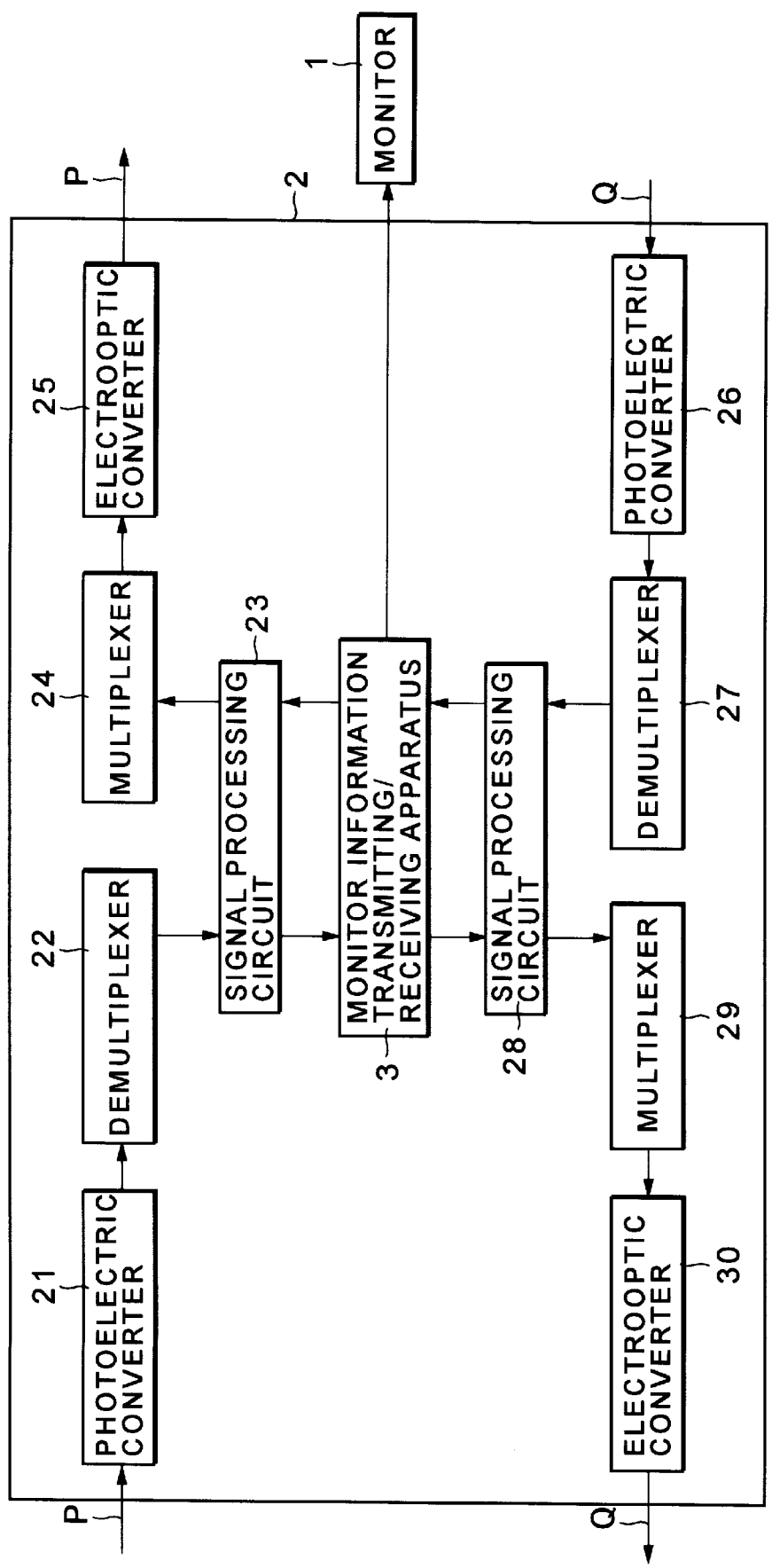
FIG. 2 is a block diagram showing an example of the arrangement of a cable landing station in FIG. 1.

FIG. 2 is a block diagram showing an example of the arrangement of each cable landing station 2 in FIG. 1. Although FIG. 2 shows only the arrangement of one cable landing station, each of the stations A to H has the arrangement shown in FIG. 2. In addition, FIG. 2 shows each of the monitors 1A to 1H shown in FIG. 1 as a monitor 1.

A multiplexed optical signal sent from one adjacent station through the submarine optical cable in the outer route P is converted into an electrical signal by a photoelectric converter 21. This signal is demultiplexed into signals corresponding to the respective channels by a demultiplexer 22. A signal processing circuit 23 extracts an overhead signal portion from the signal processed by the demultiplexer 22. In this embodiment, the overhead signal contains monitor information data on the stations A to H. The signal processing circuit 23 transfers the monitor information data on the stations A to H, contained in the overhead signal, to a monitor information transmitting/receiving apparatus 3. A multiplexer 24 multiplexes the transmission signals corresponding to he respective channels. The signal processing circuit 23 also controls to set the monitor information data on the self-station and remote stations in the overhead signal in the transmission signal. The transmission signal output from the multiplexer 24 is converted into an optical signal by an electro-optic converter 25, and is transmitted to the other adjacent station through the outer route P.

A multiplexed optical signal sent from one adjacent station through the submarine optical cable in the outer route Q is converted into an electrical signal by a photoelectric converter 26. This signal is demultiplexed into signals corresponding to the respective channels by a demultiplexer 27. A signal processing circuit 28 extracts an overhead signal portion from the signal processed by the demultiplexer 27. In this embodiment, the overhead signal contains monitor information data on the stations A to H. The signal processing circuit 28 transfers the monitor information data on the stations A to H, contained in the overhead signal, to a monitor information transmitting/receiving apparatus 3. A multiplexer 29 multiplexes the transmission signals corresponding to the respective channels. The signal processing circuit 28 also controls to set the monitor information data on the self-station and remote stations in the overhead signal in the transmission signal. The transmission signal output from the multiplexer 29 is converted into an optical signal by an electro-optic converter 30, and is transmitted to the other adjacent station through the outer route P.

Figure 3:
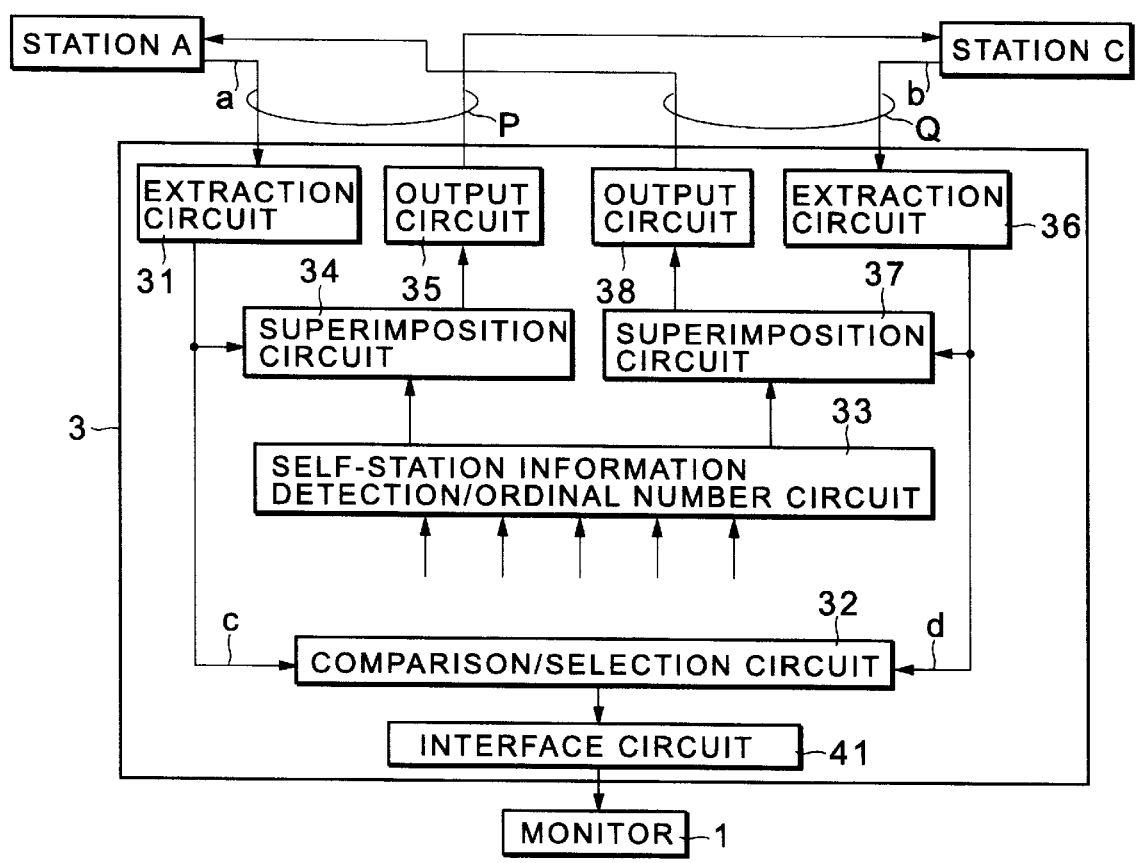
FIG. 3 is a block diagram showing the arrangement of a monitor information transmitting/receiving apparatus according to the present invention.

FIG. 3 is a block diagram showing the arrangement of the monitor information transmitting/receiving apparatus 3. Although the monitor information transmitting/receiving apparatus 3 of the station B will be described below, the monitor information transmitting/receiving apparatus 3 of each of the remaining stations may have the same arrangement. In the monitor information transmitting/receiving apparatus 3, an extraction circuit 31 extracts monitor information c from an overhead signal from the signal processing circuit 23 in FIG. 2, and outputs it to a superimposition circuit 34 and a comparison/selection circuit 32. An extraction circuit 36 extracts monitor information d from an overhead signal from the signal processing circuit 28 in FIG. 2, and outputs it to a superimposition circuit 37 and the comparison/selection circuit 32. For the sake of easy understanding, FIG. 3 shows that the signals are directly sent from the stations A and C to the extraction circuits 31 and 36. In practice, however, these signals are transferred to the extraction circuits 31 and 36 through the components of the cable landing station 2 as shown in FIG. 2.

The comparison/selection circuit 32 compares the monitor information c with the monitor information d, and sends monitor information e based on the comparison result to the monitor 1 through an interface circuit 41. The monitor 1 controls the display of the monitor information e. A self-station information detection/ordinal number circuit 33 receives various kinds of information about the station of which it forms a part (station B in the example being considered), adds numbers specifying the times to these pieces of information, and outputs them to the superimposition circuits 34 and 37. The superimposition circuit 34 updates the portion of the monitor information from the extraction circuit 31 which relates to the station of which it forms a part with the information from the self-station information detection/ordinal number circuit 33, and outputs the updated monitor information to the signal processing circuit 23 through an output circuit 35. The superimposition circuit 37 updates the portion of the monitor information from the extraction circuit 36 which relates to the station of which it forms a part with the informational from the self-station information detection/ordinal number circuit 33, and outputs the updated monitor information to the signal processing circuit 28 trough an output circuit 38.

Figure 4A:
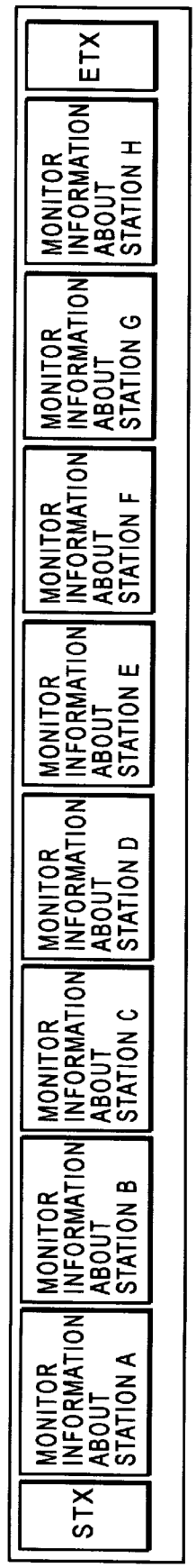
FIGS. 4A and 4B are views showing an example of the format of monitor information contained in an overhead signal.
Figure 4B:
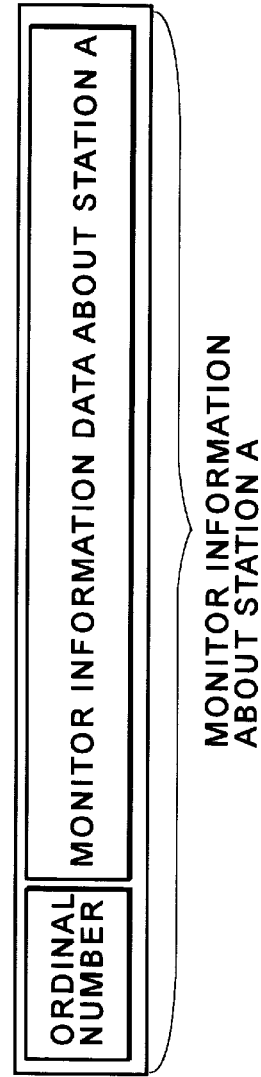

FIG. 4A explains an example of the format of the monitor information contained in an overhead signal. The stations A to H sequentially transfer pieces of monitor information each having the format shown in FIG. 4A Through the outer route P and he inner route Q. Each station sets various kinds of self-station information in the self-station monitor information area in the format shown in FIG. 4A, and sets pieces of received information in the remaining monitor information areas without any change. Although not shown, the format in FIG. 4A includes check data such as a parity check bit. In addition, as shown in FIG. 4B, the ordinal number corresponding to the transmission time is set in the monitor information area for each station, in addition to the monitor information data about each station. Although FIG. 4B shows the set contents of the monitor information area for the station A, the set contents of the monitor information area for each of the remaining stations includes the ordinal number corresponding to the transmission time of the monitor information data about each station. As ordinal numbers, for example, numbers starting from "01" are used. For example, this number is incremented at the time of transmission of monitor information.

The operation of the monitor information transmitting/receiving apparatus 3 will be described next.

The operation will be described below by taking the monitor information transmit receiving apparatus 3 in the station B as an example. The monitor information transmitting/receiving apparatus 3 in the station B receives monitor information A in the overhead signal sent from the station A through the signal processing circuit 23. In this embodiment, the monitor information a has the format shown in FIG. 4A. The extraction on circuit 31 performs a parity check on the input information and outputs it as the monitor information c to the superimposition circuit 34 and the comparison/selection circuit 32. In the monitor information areas for the respective stations in the monitor information c, monitor information data set by the respective stations when the information has passed through the stations are set. Ordinal numbers for specifying the times at which the stations set their respective monitor information data in the monitor information are set.

Note that each station transmits monitor information at predetermined intervals, e.g., at one-second intervals.

Monitor information b in the overhead signal sent from the station C is input to the monitor information transmitting/receiving apparatus 3 through the signal processing circuit 28. The monitor information b also has the format shown in FIG. 4A. The extraction circuit 36 performs a parity check on the input information and outputs it as the monitor information d to the superimposition circuit 37 and the comparison/selection circuit 32. In the monitor information areas for the respective stations in the monitor information c, monitor information data set by the respective stations when the information has passed through the stations are set. As ordinal numbers, numbers for specifying the times at which the respective stations set the monitor information data are set.

The comparison/selection circuit 32 compares the ordinal number m the monitor information area for each station in the monitor information d with the ordinal number in the monitor information area for each station in monitor information C. The comparison/selection circuit 32 then sends for each respective station 2, the monitor information data corresponding to the larger ordinal number for that station as the latest monitor information data for the corresponding station to the monitor 1 through the interface circuit 41. The monitor 1 displays the contents of the received monitor information data for the respective stations.

The self-station information detection/ordinal number circuit 33 receives various kind of self-station information such as we information and supply voltage/current information for the self-station, and outputs, to the superposition circuits 34 and 37, the various kinds of self-station information and au ordinal number which is larger than the ordinal number set when the previous monitor information was sent by one. The superimposition circuit 34 stores the monitor information c from the extraction circuit 31. The superimposition circuit 34 sets the various kinds of self-station information input from the self-station information detection/ordinal number circuit 33 in the monitor information area for the self-station (the station B in this case) in the monitor informational In addition, the superimposition circuit 34 sets the ordinal number input from the self-station information detection/ordinal number circuit 33 in the ordinal number field in the self-station monitor information area, but does not change the contents of the monitor information areas for the remaining station. The superimposition circuit 34 outputs the new monitor information generated in this manner to the output circuit 35. The output circuit 35 outputs the new monitor information to the signal processing circuit 23. The sign processing circuit 23 sets the new monitor information in the overhead signal in the transmission signal sent to be sent to the station C through the outer router P. The overhead signal in the signal to be sent to the station C therefore contains the monitor information with the monitor information area for the station B being updated.

The superimposition circuit 37 stores the monitor information d from the extraction circuit 36. The superimposition circuit 37 sets the various kinds of self-station information input from the self-station information detection/ordinal number circuit 33 in the monitor information area for the self-station (the station B in this case) in the monitor information. In addition, the superimposition circuit 37 sets the ordinal number input from the self-station information detection/ordinal number circuit 33 in the ordinal number field in the self-station monitor information area, but does not change the contents of the monitor information areas for the remaining stations. The superimposition circuit 37 outputs the new monitor information generated in this manner to the output circuit 38. The output circuit 38 outputs the new monitor information to the signal processing circuit 28. The signal processing circuit 28 sets the new monitor information in the overhead signal in the transmission signal sent to be sent to the station A through the inner router Q. The overhead signal in the signal to be sent to the station A therefore contains the monitor information with the monitor information area for the station B being updated.

Control on detection of the latest information from received monitor information will be described further in detail next with reference to FIGS. 5 to 7.

This operation will also be described by taking the operation of the station B as an example. For the sake of simplicity, assume that the respective stations set the ordinal numbers to "01" first, and simultaneously start sending monitor information. Also, assume that each station sends monitor information at one-second intervals afterward. In addition, assume that monitor information like the one shown in FIG. 5 from the station C has arrived at the station B through the inner route Q after a lapse of a certain period of time. In this monitor information, for example, the ordinal number in the monitor information area for the A station is "1". The ordinal number of the monitor information area for each of the remaining stations is larger than "1" set by the station A by one.

FIG. 6 shows the contents of the monitor information sent from the station A to the station B through the outer router P. In this embodiment, there is no station between the stations A and B on the outer router P, but six stations are present between the stations A and B on the inner route Q.

That is, the monitor information data about the station A, received through the inner route Q, is older than the monitor information data about the station A, received at the same time through the outer router P, by six cycles of monitor information transmission.

As shown in FIG. 6, the ordinal number for the station A, received through the outer router P, is "7", which is larger than the ordinal number ("1") for the station A, received through the inner route Q, by "6". That is, when the ordinal number ("1") for the station A, received through the inner route Q, is compared with the ordinal number ("7") for the station A, received through the outer router P, the larger ordinal number indicates new monitor information data. The comparison/selection circuit 32 therefore selects the monitor information data corresponding to the larger ordinal number as the latest data. The comparison/selection circuit 32 also compares the ordinal number in the monitor information about each of the stations C to H, received through the inner route Q, with that of the monitor information about each of the stations C to H, received through the outer router P, and selects the monitor information data corresponding to each larger ordinal number as the latest data.

FIG. 7 explains the monitor information e selected and generated by the comparison/selection circuit 32 from the monitor information d received through the inner route Q as shown in FIG. 5 and the monitor information c received through the outer router P as shown in FIG. 6. This monitor information e is sent to the monitor 1 through the interface circuit 41. The monitor 1 displays the monitor information e.

In the above manner, the monitor 1 can obtain and display the latest monitor information data about each station.

Although the operation of the station B has been described above as an example, the latest monitor information data about the remaining stations can be obtained and displayed by performing the same processing as described above for the remaining stations.

In addition, in this embodiment, as information specifying the monitor information transmission time, an ordinal number is used. However, information in another form can also be used. For example, time information itself can be used.

Monitor information on the outer router P and monitor information on the inner route Q do not always arrive at a given station at the same time because of differences between the monitor information transmission times or transmission delays in the respective stations. A certain wait time between the arrival of monitor information through one route and the arrival of monitor information through the other route is therefore set in the comparison/selection circuit 32. If no monitor information arrives at a given station through the other route after a lapse of the wait time, it is determined that line disconnection or the like has occurred on the route, and the monitor information that has already arrived at the given station is sent to the monitor 1.

According to this embodiment, in a submarine cable system in which a plurality of cable landing stations are arranged in the form of a ring, pieces of monitor information about the respective stations are exchanged through the lines of the submarine cables on the two routes, and monitor information data, of the monitor information data contained in the pieces of monitor information received through the two routes, which corresponds to a larger ordinal number is selected. This makes transfer of monitor information redundant, leading to an improvement in reliability, and always allows the monitor 1 to obtain the least information about each station, saving unnecessary logging.

What is claimed is:

1. A monitor information transmitting/receiving apparatus for transmitting/receiving monitor information data about each cable landing station in a submarine cable system in which a plurality of cable landing stations are arranged in the form of a ring, comprising:

monitor information setting means for generating monitor information to be transmitted by setting monitor information including monitor data about a self-station and monitor information data about each of the other stations which is received through each of routes in two directions, and containing data for specifying set times in the monitor information; and selection means for selecting data, of the monitor information data about the respective stations which are received through the respective routes in the two direction, which corresponds to new set time as latest monitor information data.

2. An apparatus according to claim 1, further comprising signal processing means for setting monitor information in an overhead signal.

3. An apparatus according to claim 1, wherein said monitor information setting means uses a number whose numerical value increases with time as data for specifying set time.

4. An apparatus according to claim 3, further comprising signal processing means for setting monitor information in an overhead signal.

5. An apparatus according to claim 3, wherein the selection means selects data of the monitor information data about the respective stations which are received trough the respective routes in the two directions, which corresponds to the most recent set time.

6. An apparatus according to claim 5, further comprising signal processing means for setting monitor information in an overhead signal.

7. An apparatus according to claim 1, wherein said monitor information setting means includes superimposition means for storing received monitor information, rewriting only the monitor information data about the self-station, of the stored information, and sending the monitor information.

8. An apparatus according to claim 2, further comprising signal processing means for setting monitor information in an overhead signal.

9. An apparatus according to claim 7, wherein said monitor information setting means uses a number whose numerical value increases with time as data for specifying set time.

10. An apparatus according to claim 9, wherein said selection means selects data, of the monitor information data about the respective stations which are received through the respective routes in the two directions, which corresponds to the most recent set time.

11. An apparatus according to claim 9, further comprising signal processing means for setting monitor information in an overhead signal.

12. An apparatus according to claim 10, further comprising signal processing means for setting monitor information in an overhead signal.

13. A monitor information transmitting/receiving apparatus for use in an underwater cable system of the type which includes a plurality of cable landing stations which are arranged to communicate with each other in a ring, the monitor information transmitting/receiving apparatus being associated with one of the underwater landing stations and receiving monitoring information signals sent in two different directions along the ring, each monitor information signal containing respective monitor information data for each of the other cable landing stations, the respective monitor information data including both monitor data relating to the respective landing station and time data relating to the time at which such monitor data was generated, the monitor information transmitting/receiving apparatus comprising:

monitor information setting means which receives monitor information signals from both directions and transmits updated monitor information signals which contain updated monitor data relating to the one landing station and updated time data for the updated monitor data; and selection means which examines information concerning respective pairs of monitor information signals received from opposite directions and selects the most recent monitor data for each of the other landing stations as indicated by the time data associated with such monitor data.

14. The apparatus of claim 13, wherein the time data is expressed as an ordinal number.

15. The apparatus of claim 14, wherein the monitor information setting means increases the ordinal number by one each time it transmits updated monitor information signals.

* * * * *